United States Patent [19]
Cornelison, Jr.

[11] 4,236,504
[45] Dec. 2, 1980

[54] IMPELLERS AND APPARATUS FOR USE THEREWITH

[76] Inventor: Floyd S. Cornelison, Jr., 16 Stone Hill Rd., Wilmington, Del. 19803

[21] Appl. No.: 38,455

[22] Filed: May 14, 1979

[51] Int. Cl.³ .............................................. F24C 9/00
[52] U.S. Cl. ..................................... 126/247; 416/51; 416/198 R
[58] Field of Search ............ 73/189; 416/44, DIG. 4, 416/51, 52, 31, 132 R, 132 B, 135, 142, 143, 145; 126/247

[56] References Cited

U.S. PATENT DOCUMENTS

| | | |
|---|---|---|
| 228,283 | 6/1880 | Smith ....................................... 416/52 |
| 303,585 | 8/1884 | Morehouse . |
| 459,184 | 9/1901 | Hawkins . |
| 665,891 | 1/1901 | Fetty . |
| 691,082 | 1/1902 | Thompson . |
| 2,224,851 | 12/1940 | Lea . |
| 3,020,963 | 2/1962 | Hakkarinen . |
| 3,897,170 | 7/1975 | Darvishian ........................... 416/119 |

FOREIGN PATENT DOCUMENTS 7604596 11/1977 Netherlands ....................... 416/DIG. 4

*Primary Examiner*—Jerry W. Myracle
*Attorney, Agent, or Firm*—Zachary T. Wobensmith, 2nd; Zachary T. Wobensmith, III

[57] ABSTRACT

An impeller and apparatus for use therewith are described, the impellers having collapsible cups presenting variable entrance areas with respect to the fluid, the areas being determined by the velocity of rotation around a shaft on which the cups are carried. The apparatus for utilization of the impellers comprises a wind driven machine for power output, a wind driven machine having a plurality of levels of impellers, a wind driven machine for starting another wind driven machine which is difficult to start on its own, and a wind driven machine utilizing the impellers for providing turbulence in a liquid.

12 Claims, 9 Drawing Figures

IMPELLERS AND APPARATUS FOR USE THEREWITH

BACKGROUND OF THE INVENTION

1. Field of the Invention

This invention relates to impellers and to apparatus for use therewith.

2. Description of the Prior Art

It has been common practive to mount, on a vertical axis, cups of fixed size, many anemometers now in use being so constructed. A primitive device of this character is shown in the U.S. Pat. No. 691,082 to Thompson. See also U.S. Pat. No. 303,585 to Morehouse, No. 459,184 to Hawkins, No. 2,224,851 to Lea, and No. 3,020,963 to Hakkarinen.

The use of fixed caps on impeller units increases the wind resistance and decreases the wind acceptance particularly with increasing wind velocity.

Darvishian, in U.S. Pat. No. 3,897,170 shows the use of cup-shaped wind receptors of fixed size mounted to move from positions of maximum resistance to the wind when moving with the wind to positions of minimum wind resistance when moving against the wind.

Fetty in U.S. Pat. No. 665,891 shows a windmill with hinged wing plates, upper and lower pairs of plates being connected by connecting rods 39, 40, for movement together, with stop flanges 44 limiting opening movement. Governors are provided, including levers 45 with horizontal fulcrums 46 with notched tail pieces 47 and a weight 48. A projection 49 is provided for engagement with the tail piece 47. As the wheels rotate the weights 48, urged outwardly by centrifugal force which will vary with the speed of rotation, by engagement of the tail pieces 47 with the studs 49 will prevent further opening of the wings unless the wind is not violent and the weights are not thrown outwardly by centrifugal force.

None of the prior art devices known to the inventor show impellers either as wind receptors or as agitators in the form of collapsible cups carried on radial arms extending from a vertical shaft and in which the area of the cup facing the fluid, wind or liquid, is varied by the centrifugal force acting therein to collapse or flatten the cups.

None of the prior art devices known to the inventor have individual wind receptors or cups which are open in one condition and are flattened or collapsed in another position to provide less wind acceptance and less total wind resistance.

None of the prior art devices known to the inventor embody collapsible cups with adaptability to different wind velocities if exposed to the wind or the adaptability to conform to varying energy input if employed in a liquid for turbulence.

SUMMARY OF THE INVENTION

In accordance with the invention an impeller is provided having collapsible cups presenting variable entrance areas determined by the velocity of rotation around a shaft on which the cups are carried, together with apparatus for utilizing the impellers which can comprise a wind driven machine for power output, a wind driven machine having a plurality of sizes and levels of impellers, a wind driven machine for starting other wind driven machines which are difficult to start on their own, and a wind driven machine for providing turbulence in a liquid.

It is the principal object of the invention to provide an impeller having collapsible cups presenting variable entrance areas determined by the velocity of rotation around a shaft in one aspect of which the cups are open at low wind speeds providing greater wind acceptance and are collapsed or flattened at higher wind speeds to provide less wind acceptance or less total wind resistance by centrifugal action.

It is a further object of the invention to provide an impeller having collapsible cups which in a liquid, and centrifugally controlled, function reversely to present minimum opening at low speed operation and maximum opening with high speed operation It is a further object of the invention to provide a wind driven machine having one or more levels of impellers, and with varying sizes of cups, to accommodate varying levels of wind velocity.

It is a further object of the invention to provide a wind driven machine which is suitable for starting other types of wind driven machines which are difficult to start and which will not interfere with the continued operation of such other types of machines.

It is a further object of the invention to provide a wind driven machine which is less subject to damage and injury with very high velocity winds which have a destructive effect particularly on propeller type windmills.

It is a further object of the invention to provide a wind driven machine rotating on a vertical axis, which can receive wind from any direction without the necessity for orientation, which is capable of rotation at very low wind speeds, in which the impeller components can be at different levels, in different sizes and with the cups arranged so that some cups are always facing the wind.

Other objects and advantageous features of the invention will be apparent from the description and claims.

BRIEF DESCRIPTION OF THE DRAWINGS

The nature and characteristic features of the invention will be more readily understood from the following description taken in connection with the accompanying drawings forming part hereof in which.

Figure 2:
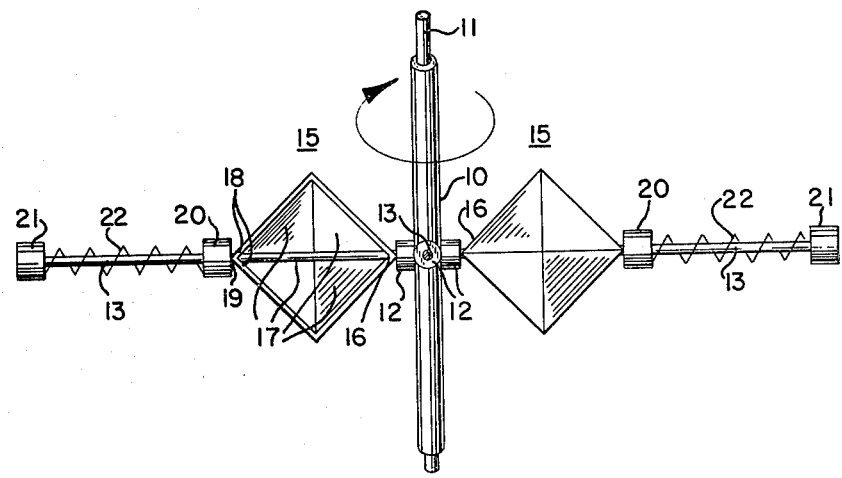
FIG. 2 is a vertical sectional view of the wind driven machine of FIG. 1, taken approximately on the line 2—2 of FIG. 1 with the cups in positions for low wind velocities.

It should, of course, be understood that the description and drawings herein are illustrative merely and that various modifications and changes can be made in the structure disclosed without departing from the spirit of the invention.

Like numerals refer to like parts throughout the several views.

DESCRIPTION OF PREFERRED EMBODIMENTS

Referring now more particularly to FIGS. 1 to 4, inclusive, of the drawings, the wind driven machine there illustrated includes a hollow vertical driven shaft 10, carried on a vertical stationary post 11, supported in any desired manner such as is described below.

The shaft 10 has bushings 12 secured thereto with rods 13 engaged therein. The rods 13 extend radially and horizontally outwardly from the shaft 10. While any desired number of rods 13 may be employed, four being shown in FIG. 1, one opposite pair of rods 13 being omitted from FIGS. 2 and 3 in the interest of clarity of illustration.

Each of the rods 13 has mounted thereon a collapsible receptor cup 15, one edge margin 16 of which is secured to one of the bushings 12. The cup 15 can be made in any desired shape capable of collapse, a cup 15 having four triangular panels 17 being particularly suitable. The cups 15 can be made of any suitable material of adequate strength and capable of manipulation, such as synthetic plastic, textile fabric or the like.

Each cup 15, at the side marginal edge 18, opposite to the marginal edge 16 has an opening 19 for sliding movement on the rod 13 on which it is carried and has the marginal edge 18, opposite to the marginal edge 16 secured to a weight 20. The weight 20 is preferably in the form of a collar and slidable on the rod 13.

At the end of each rod 13 an end stop 21 is provided, and a spring 22 is provided interposed between the end stop 21 and the weight 20. The spring 22 is preferably of a length and spring rate so that when the shaft 11 is at rest the cup 15 is fully open as shown in FIGS. 1 and 2.

Figure 1:
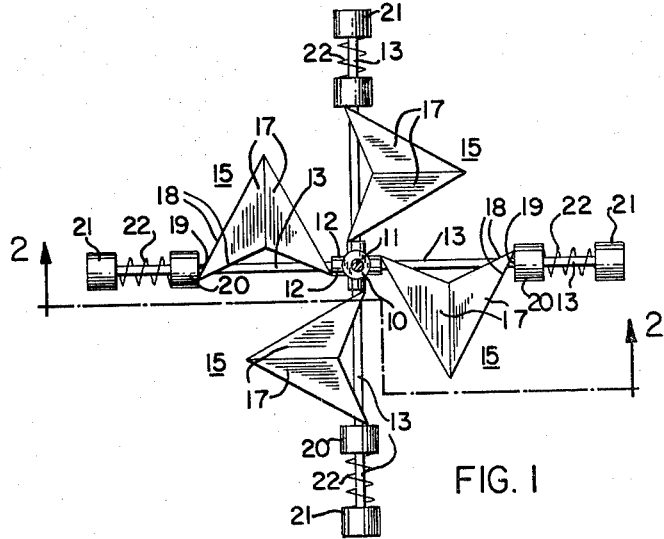
FIG. 1 is a top plan view of a simple wind driven machine in accordance with the invention.
Figure 4:
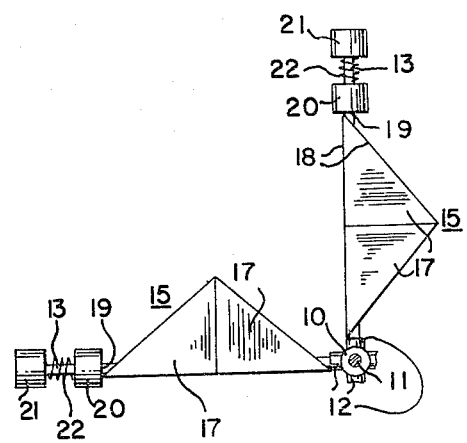
FIG. 4 is a vertical sectional view, enlarged, taken approximately on the line 4—4 of FIG. 3.

The weight 20, upon rotation of the shaft 10, moves outwardly by centrifugal force tending to elongate the cup 15, as shown in FIGS. 1 and 4, to reduce the front and rear areas exposed to the wind and with consequent reduction of wind resistance. The mass of the weight 20 and the spring force of the spring 22, can be varied in accordance with the expected wind velocity.

Figure 5:
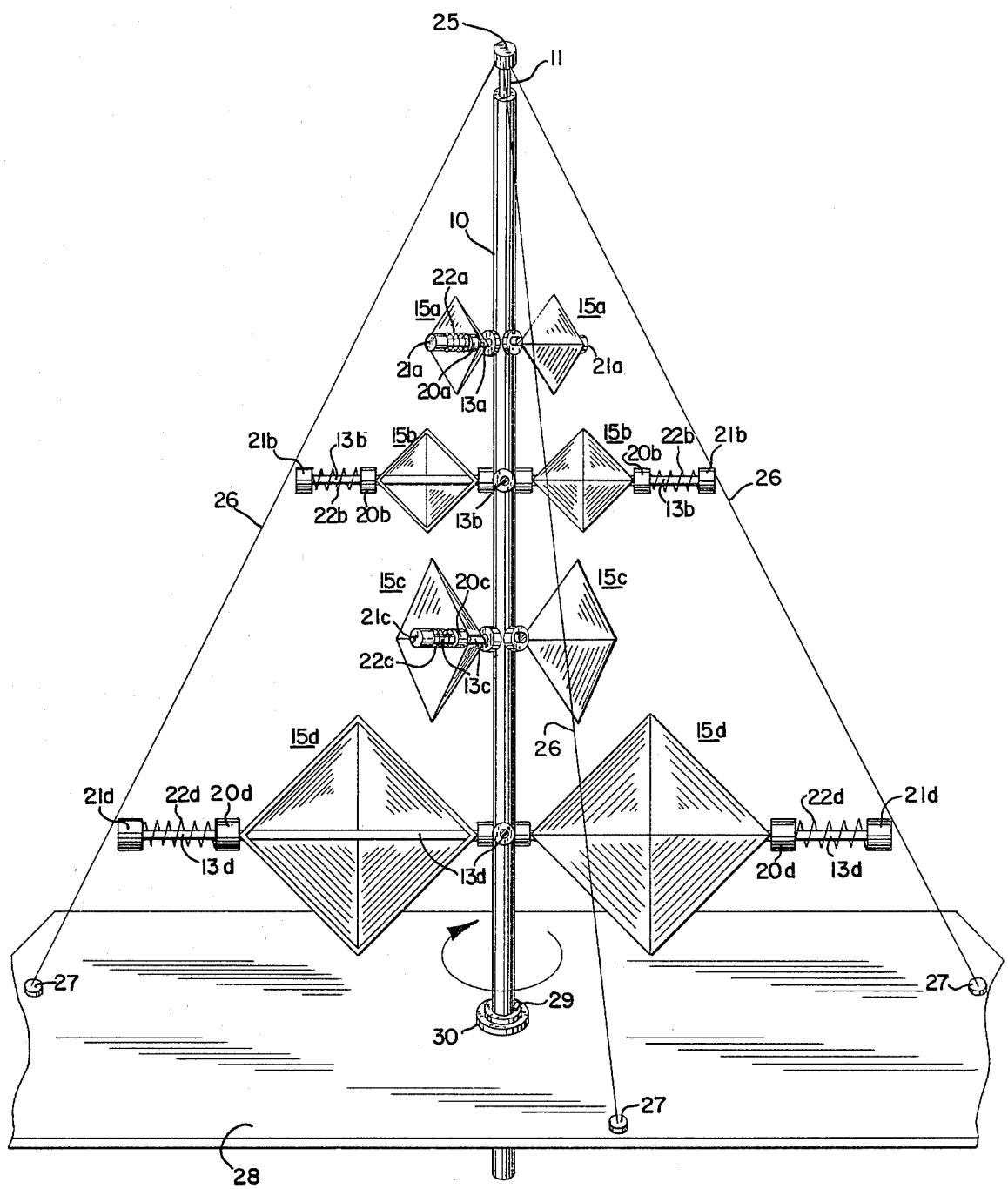
FIG. 5 is a view in elevation of a wind driven machine in accordance with the invention with a plurality of levels and sizes of impellers, and at zero or low wind velocity, parts being omitted in the interest of clarity.
Figure 6:
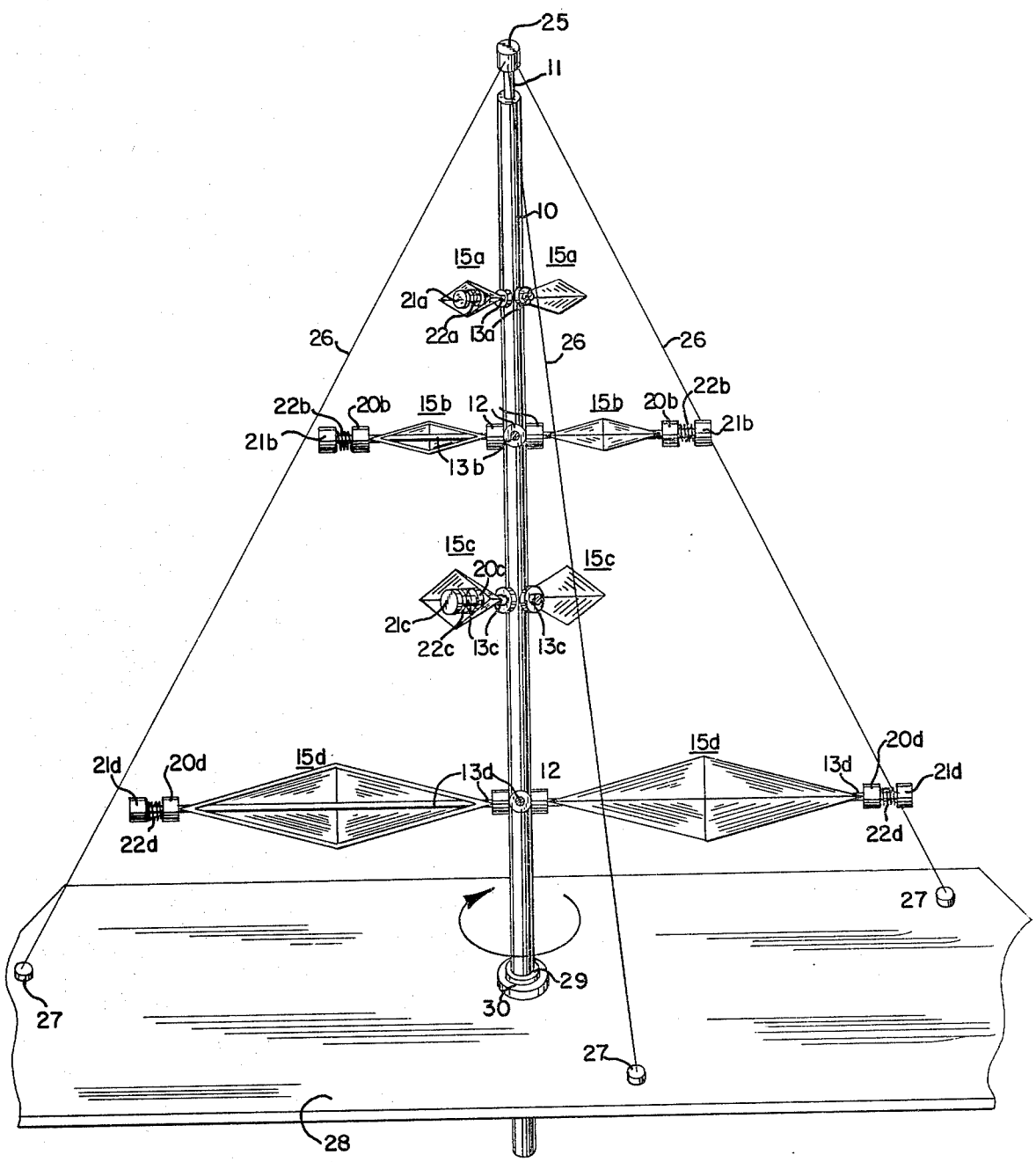
FIG. 6 is a view similar to FIG. 5 at a higher wind velocity.

Referring now to FIGS. 5 and 6, in the form of the invention there shown the post 11 is provided with an upper end cup 25 with guy wires 26 extending therefrom to anchors 27 on a base 28 and with a supporting bearing ring 29 for the shaft 10, in engagement with a bearing plate 30.

In place of the single level of rods 13 and cups 15, as shown in FIGS. 1 to 4, inclusive, a plurality of rods 13a, 13b, 13c and 13d are provided, at different levels and circumferentially displaced around the shaft 10. The rods 13a, 13b, 13c and 13d have cups 15a, 15b, 15c and 15d, weights 20a, 20b, 20c and 20d, end stops 21a, 21b, 21c and 21d and springs 22a, 22b, 22c and 22d similar to those previously described but with larger cups 15d at the bottom with decreasing sizes of cups 15a, 15b and 15c in ascending relation to provide a tree.

The rods 13a, 13b, 13c and 13d are secured to the shaft 10 at different angles about the central axis so that at least one collapsible wind cup is in substantially a direct line of any available wind.

Figure 7:
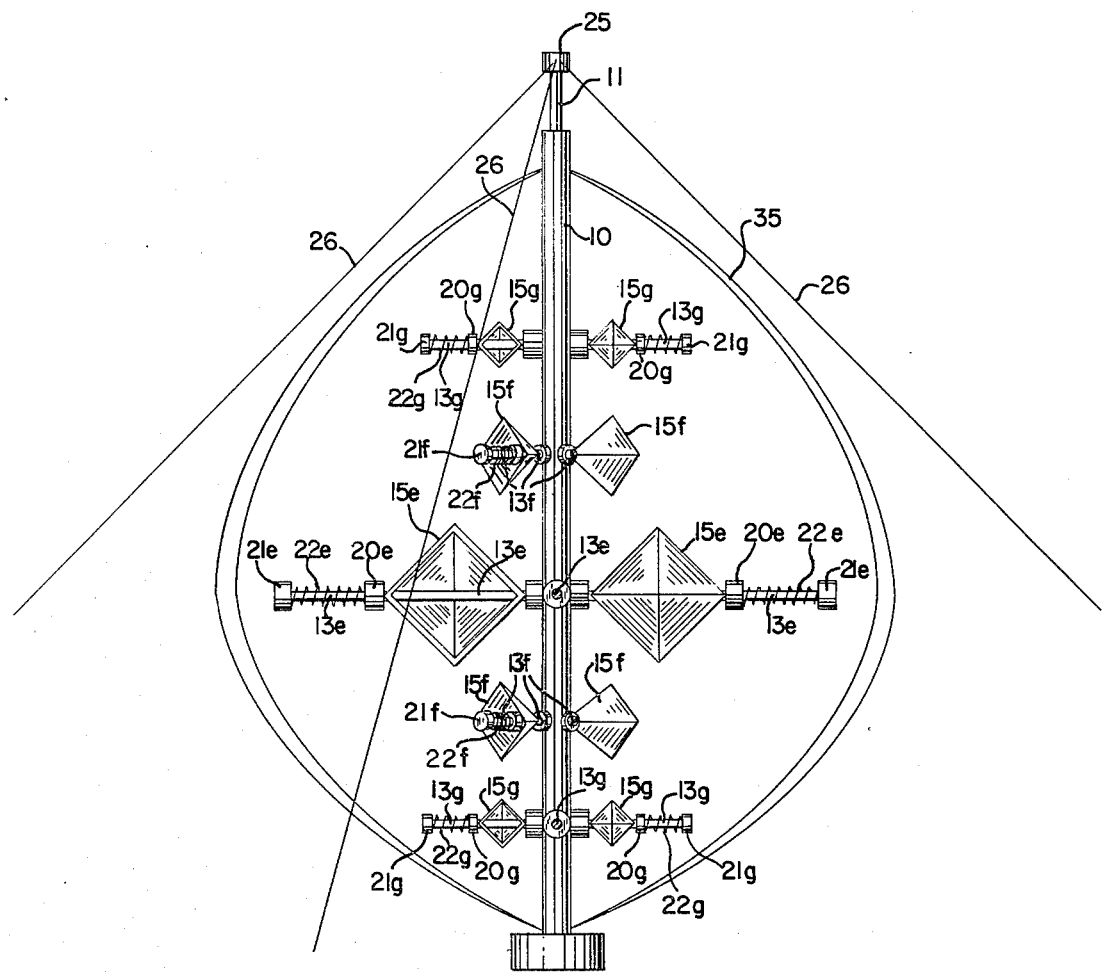
FIG. 7 is a view in elevation showing the wind machine of the present invention applied to a wind machine which is difficult to start, such as a Darrieus turbine.

Referring now to FIG. 7 the wind machine there shown is connected to the shaft 10 of a Darrieus turbine 35 in such a manner as to be available for starting up the turbine 35. It has been recognized that the Darrieus turbine is difficult to start, particularly at low wind velocities. The wind machine shown in FIG. 7 has the larger lengths of rods 13e at the center with decreasing lengths of rods 13f and 13g thereabove and therebelow. The rods 13e, 13f and 13g are provided with bushings 12, and have mounted thereon, as previously described, cups 15e, 15f and 15g, weights 20e, 20f and 20g, end stops 21e, 21f and 21g with interposed springs 22e, 22f and 22g. The turbine 35 may be braced with an end cup 25 and guy wires 26 extending therefrom.

Figure 8:
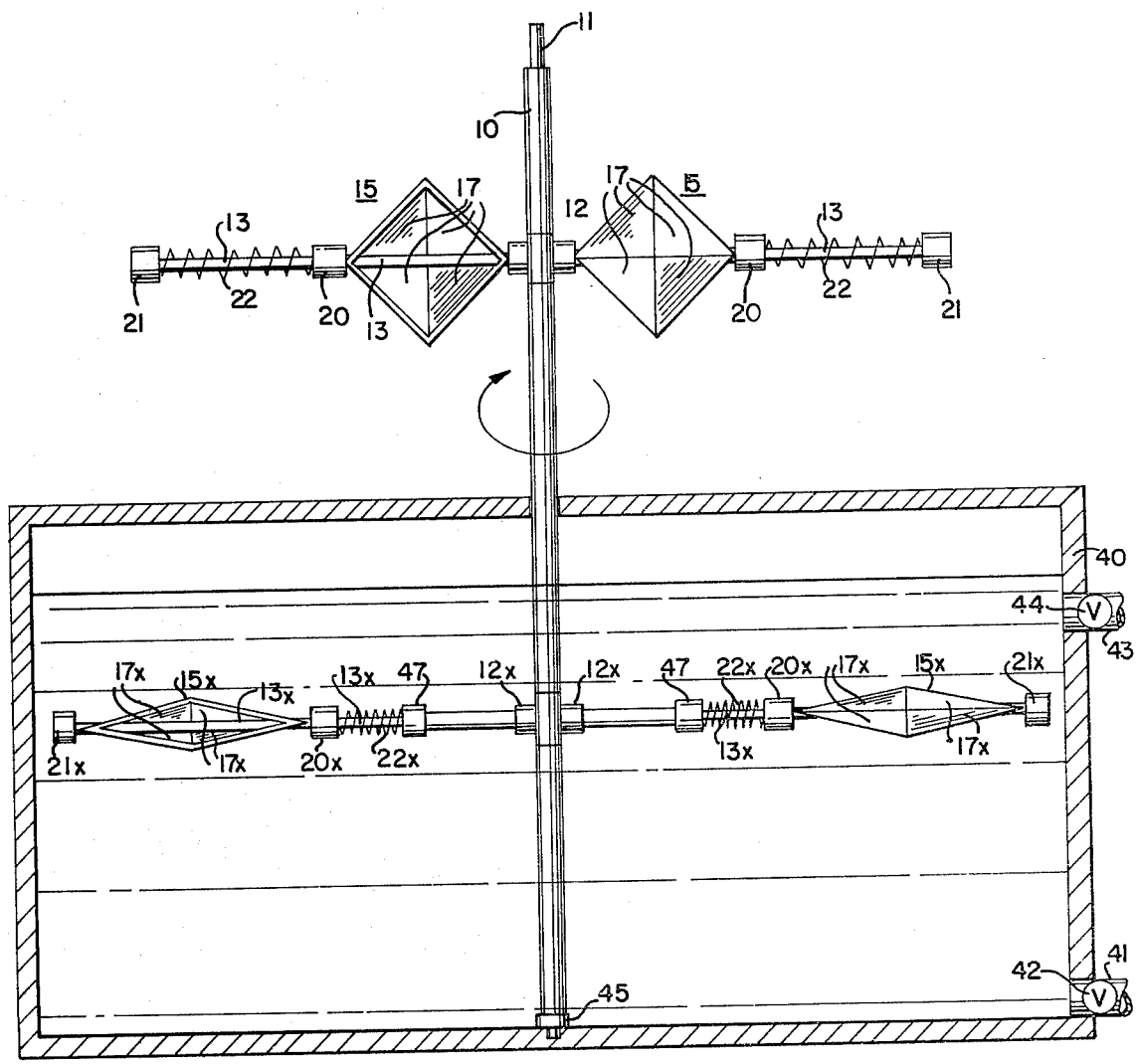
FIG. 8 is a view partly in elevation and partly in vertical section showing a wind machine at low wind speed driving a liquid turbulence producing device in which the impeller in the liquid is similar to the wind operated impeller but with the liquid turbulence cups collapsed at low wind speeds.
Figure 9:
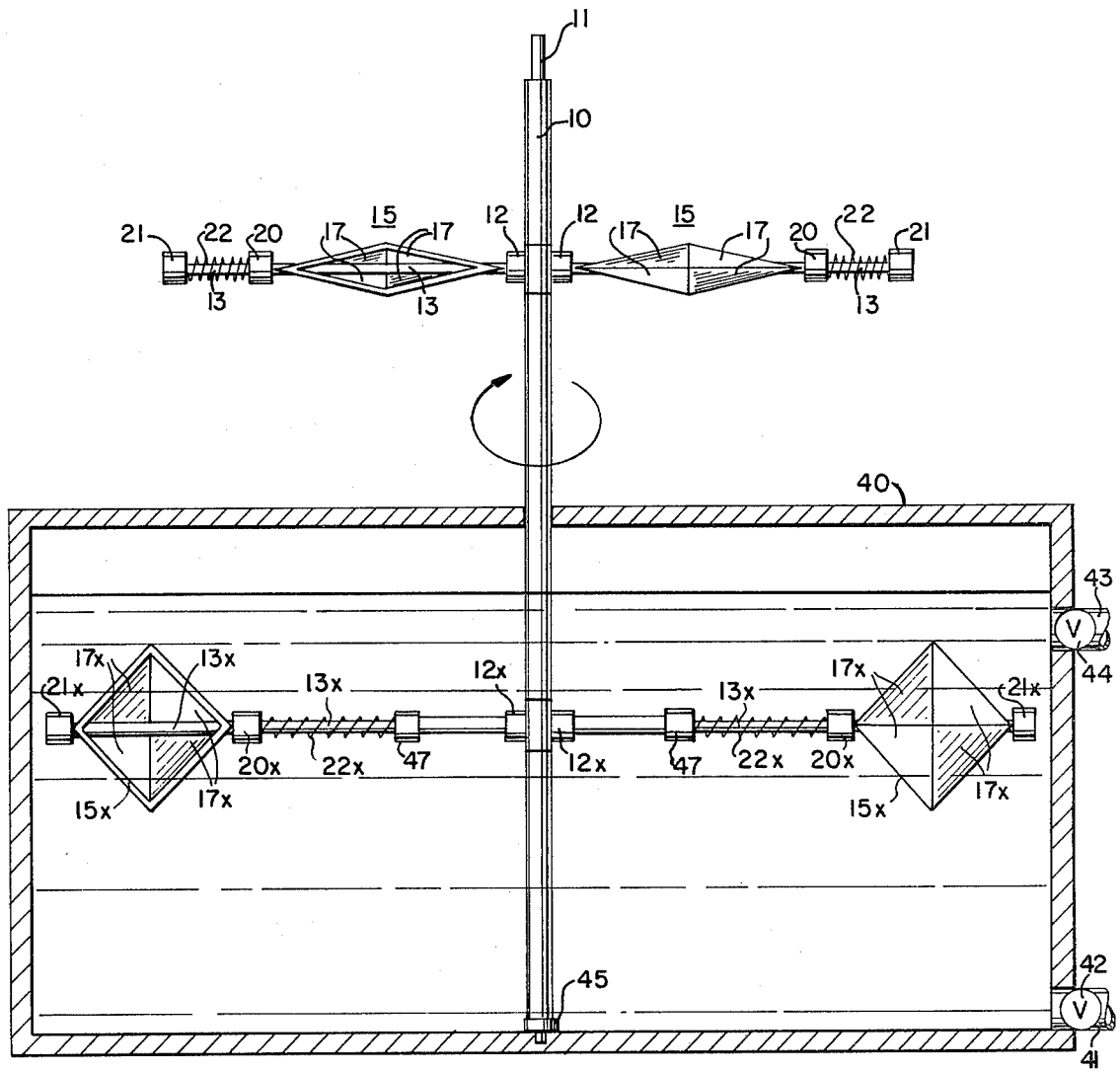
FIG. 9 is a view similar to FIG. 8 but with the wind operated and liquid turbulence impeller in the condition for higher wind speed operation.

Referring now to FIGS. 8 and 9, a wind machine similar to that described with respect to FIGS. 1 to 4, inclusive is shown with a shaft 10 on a post 11, with rod bushings 12, rods 13, cups 15 with panels 17, weights 20, end stops 21 and springs 22, as before.

The structure of FIGS. 8 and 9 is particularly adapted for heat absorption in a liquid from energy available for driving a wind machine. For this purpose a tank 40 is provided having a liquid inlet pipe 41 with control valve 42, and a liquid delivery pipe 43 with control valve 44.

The tank 40 is shown as having the post 11 and shaft 12 extending thereinto with a bottom bearing 45 supporting the shaft 10.

The shaft 10, within the tank 40 and below the level of the liquid therein, has bushings 12x secured thereto. The bushings 12x have rods 13x extending radially and horizontally therefrom with cups 15x thereon having panels 17x as before. In this application of the impellers the cups 15x are secured to the outer end stops 21x on the rods 13x and the weights 20x have tension springs 22x secured thereto at one end, the other end of the springs 22x being secured to inner end stops 47. The cups 15x are normally collapsed when at rest or at low wind velocity effective on the wind machine but are opened as the speed increases so as to be fully open at higher speeds of the shaft 10 so as to impart greater turbulence to the liquid in the tank 40 for increased heat absorption in the liquid with greater wind velocity.

The mode of operation will now be pointed out.

Figure 3:
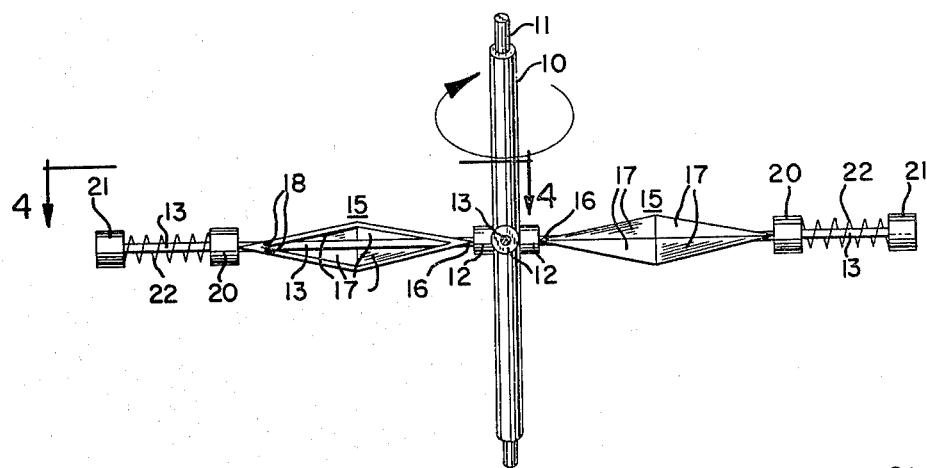
FIG. 3 is a view similar to FIG. 2 but showing the cups in positions when subjected to higher wind velocities.

Referring first to FIGS. 1 to 4, inclusive, at starting up and with a light wind acting at the wind machine, the cups 15 will be in the expanded or open condition as shown in FIGS. 1 and 2. As the wind velocity increases, by the centrifugal action of the weights 20, against the force of the springs 22, the cups 15 are flattened, as shown in FIGS. 3 and 4 to reduce the wind inpringing surface area while rotation of the shaft 10 continues.

With the structures shown in FIGS. 5, 6 and 7, there will always substantially be a wind cup unit 15 facing the wind and as the wind increases the velocity of rotation of the shaft 10 increases and the cups 15 by their elongation decrease the resistance to the wind so that the cups 15 are not available to take excessive amounts of wind and gusting wind while still offering sufficient resistance to maintain rotation at the higher velocities. The reduction of the area facing the wind attendant upon the elongation of the cups 15 reduces the resistance to the wind.

In the form of the invention shown in FIGS. 5 and 6, the tree configuration is particularly adapted to variable winds while providing a driving force over a wide range of wind velocities.

In the form of the invention shown in FIG. 7 the wind machine is available as a starting mechanism for a Darrieus turbine as well as for other difficult to start wind driven machines.

In FIGS. 8 and 9, the action of the cups 15x which serve as liquid impellers rather than as wind driven cups, is related to the action of the cups 15 as previously described but reversely so as to be opened by the weights 20x against the force of the tension springs 22x as the rotational velocity increases for more effective agitation with increased rotational speed of the shaft 10.

I claim:

1. In combination
  a shaft,
  a plurality of rods extending radially and horizontally from said shaft,
  collapsible cups on said rods fixed at one end and having exposed areas in facing relation to a fluid,
  a weight responsive to centrifugal force connected to the other end of each of said cups, and
  resilient means connected to said weight for initial positioning of said cups in a predetermined condition of exposed area,
  said weights acting with said springs for changing the condition of said cups to change the exposed areas thereof.

2. The combination defined in claim 1 in which
  said weights acting with said springs to decrease the exposed areas of said cups upon increase of the rotational speed of said shaft.

3. The combination defined in claim 1 in which
  said weights acting with said springs to increase the exposed areas of said cups upon increase of the rotational speed of said shaft.

4. The combination defined in claim 1 in which
  said weights are slidably mounted on said rods.

5. The combination defined in claim 1 in which
  each of said cups has a plurality of hingedly connected panels for respective disposition to provide a maximum exposed area and a minimum exposed area.

6. The combination defined in claim 1 in which
  a plurality of said collapsible cups and the control mechanism therefor are provided at different elevations with respect to said shaft.

7. The combination defined in claim 6 in which
  the collapsible cups at one elevation are of a different size than the cups at a different elevation.

8. The combination defined in claim 7 in which
  said collapsible cups are of decreasing size in ascending relation.

9. The combination defined in claim 6 in which
  the collapsible cups at said different elevations are arranged with respect to said shaft to provide a facing cup at a plurality of different directions.

10. The combination defined in claim 1 in which
  said cups are disposed interiorly of another wind machine for starting said other wind machine.

11. The combination defined in claim 1 in which
  said shaft and said cups are exposed relative to wind for power generation.

12. In combination
  a liquid tank,
  a shaft having a portion extending into said tank with a plurality of rods thereon in said tank extending radially and horizontally from said shaft,
  collapsible cups on said rods in said tanks fixed at one end and having exposed areas in facing relation to the liquid in said tank,
  a weight responsive to centrifugal force connected to the other end of each of said cups in said tank,
  resilient means connected to said weight for initial positioning of said cups in a predetermined condition of exposed area,
  said weights acting with said springs for increasing the exposed areas of said cups upon increase of the rotational speed of said shaft.

* * * * *